(12) United States Patent
Chanda et al.

(10) Patent No.: US 10,049,601 B2
(45) Date of Patent: Aug. 14, 2018

(54) BIOFIDELIC SKIN SIMULANT

(71) Applicant: The Board of Trustees of the University of Alabama, Tuscaloosa, AL (US)

(72) Inventors: Arnab Chanda, Tuscaloosa, AL (US); Vinu Unnikrishnan, Tuscaloosa, AL (US); Zachary Flynn, Tuscaloosa, FL (US)

(73) Assignee: The Board of Trustees of The University of Alabama, Tuscaloosa, AL (US)

( * ) Notice: Subject to any disclaimer, the term of this patent is extended or adjusted under 35 U.S.C. 154(b) by 0 days.

(21) Appl. No.: 15/204,353

(22) Filed: Jul. 7, 2016

(65) Prior Publication Data

US 2017/0011657 A1    Jan. 12, 2017

Related U.S. Application Data

(60) Provisional application No. 62/189,504, filed on Jul. 7, 2015, provisional application No. 62/263,942, filed on Dec. 7, 2015.

(51) Int. Cl.
*C08L 83/04* (2006.01)
*G09B 23/30* (2006.01)

(52) U.S. Cl.
CPC .............. *G09B 23/30* (2013.01); *C08L 83/04* (2013.01); *C08L 2203/02* (2013.01); *C08L 2205/025* (2013.01)

(58) Field of Classification Search
None
See application file for complete search history.

(56) References Cited

U.S. PATENT DOCUMENTS

| | | | | |
|---|---|---|---|---|
| 4,481,001 | A * | 11/1984 | Graham | G09B 23/285 434/267 |
| 5,312,755 | A | 5/1994 | Madsen et al. | |
| 6,136,039 | A * | 10/2000 | Kristinsson | A61F 2/7812 623/36 |
| 7,222,525 | B1 | 5/2007 | Jones | |
| 8,215,165 | B2 | 7/2012 | Giurintano et al. | |
| 9,123,261 | B2 * | 9/2015 | Lowe | G09B 23/30 |
| 2007/0116766 | A1 | 5/2007 | Amick | |
| 2010/0167254 | A1 * | 7/2010 | Nguyen | G09B 23/30 434/272 |
| 2011/0207104 | A1 * | 8/2011 | Trotta | B29C 39/006 434/267 |

(Continued)

FOREIGN PATENT DOCUMENTS

WO    20130171444 A1    7/2013

OTHER PUBLICATIONS

Shergold et al. "The uniaxial stress versus strain response of pig skin and silicone rubber at low and high strain rates" International Journal of Impact Engineering, 32, 2006, 1384-1402.*

(Continued)

*Primary Examiner* — Robert S Loewe
(74) *Attorney, Agent, or Firm* — Meunier Carlin & Curfman LLC

(57) ABSTRACT

Described are biofidelic skin simulants closely mimicking the biomechanical properties of natural human skin, including vaginal skin tissue. The simulant contains a crosslinked siloxane network.

3 Claims, 10 Drawing Sheets

(56) References Cited

U.S. PATENT DOCUMENTS

2012/0015337 A1* 1/2012 Hendrickson ........ G09B 23/303
 434/267
2013/0192741 A1* 8/2013 Trotta .................... G09B 23/34
 156/61

OTHER PUBLICATIONS

Annaidh et al. "Characterization of the anisotropic mechanical properties of excised human skin" Journal of the Mechanical Behavior of Biomedical Materials, 5, 2012, 139-148.*
Payne et al. "Development of novel synthetic muscle tissues for sports impact surrogates" Journal of the Mechanical Behavior of Biomedical Materials, 41, 2015, 357-374.*
Payne et al. "The evaluation of new multi-material human soft tissue simulants for sports impact surrogates" Journal of the Mechanical Behavior of Biomedical Materials, 41, 2015, 336-356.*
Tadesse et al. "Silicone based artificial skin for humanoid facial expressions" Electroactive Polymer Actuators and Devices (EAPAD) 2009, vol. 7287, 10 pages.*
Durometer Shore Hardness Scale from Smooth-On, 2 pages, no date given.*
Technical data sheet for Moldstar 30, 5 pages, no date given.*
M. Kremer, E. Lang, and A. Berger, "Organotypical engineering of differentiated composite-skin equivalents of human keratinocytes in a collagen-GAG matrix (INTEGRA Artificial Skin) in a perfusion culture system," Langenbeck's Archives of Surgery, vol. 386, pp. 357-363, 2001.
T. Payne, S. Mitchell, R. Bibb, and M. Waters, "Initial validation of a relaxed human soft tissue simulant for sports impact surrogates," Procedia engineering, vol. 72, pp. 533-538, 2014.
T. Payne, S. Mitchell, R. Bibb, and M. Waters, "The evaluation of new multi-material human soft tissue simulants for sports impact surrogates," Journal of the mechanical behavior of biomedical materials, vol. 41, pp. 336-356, 2015.
J. Jussila, A. Leppäniemi, M. Paronen, and E. Kulomäki, "Ballistic skin simulant", Forensic science international, vol. 150, pp. 63-71, 2005.
M. Sasso, G. Palmieri, G. Chiappini, and D. Amodio, "Characterization of hyperelastic rubber-like materials by biaxial and uniaxial stretching tests based on optical methods," Polymer Testing, vol. 27, pp. 995-1004, 2008.

* cited by examiner

BIOFIDELIC SKIN SIMULANT

CROSS-REFERENCE TO RELATED APPLICATIONS

This application claims the benefit of U.S. Provisional Applications 62/189,504, filed Jul. 7, 2015, and 62/263,942, filed Dec. 7, 2015, the contents of which are hereby incorporated in their entirety.

BACKGROUND

The skin is the outer protective covering of the human body with an average total area close to 20 square feet, and composed of three layers namely the epidermis (outermost soft layer), the dermis (middle layer), and hypodermis (inner most layer made of strong connective tissues), with an average thickness of 1-4 mm. The skin is the first point of contact for any external load with the human body, and also the first barrier against any physical injury.

Skin simulants have been developed for burnt skin replacements and for medical training, such as for phlebotomical and surgical practice. Skin simulants are also useful in a variety of design and testing applications. For instance, skin simulants are employed during the development of ballistic munitions, especially in the context of non-lethal projectiles.

A successful skin simulant should accurately mimic the biomechanical properties of natural skin. Skin is a viscoelastic material and exhibits non-linear strain behavior. Furthermore, skin is not homogenous across either a single individual or a group of individuals. A single human will have skin tissues of differing stiffness, thickness and, depending on the specific location the skin occurs on the human body. As skin ages, collagen and other cellular components degrade, leading the skin to become less stiff.

Historically, intact skin obtained from human cadavers has been employed as a simulant, as well as skin samples from animals such as pigs, goats, and sheep. However, these materials present both ethical and practical challenges stemming from the harvesting and storage of biological tissues. As such, the use of synthetic skin simulants has been explored. U.S. Pat. No. 7,222,525 discloses skin/tissue simulant prepared from a gelatin block overlaid with an ether-cast polyurethane sheet. WO 2013/171444 describes a skin simulant prepared from a synthetic chamois, which can be prepared from various polymeric materials such as cotton, viscose, polyvinyl acetate, polyesters, and nylon-polyamide. These simulants, however, do not truly mimic the non-linear hyperelastic properties of true human skin.

Despite extensive research, a skin simulant having the realistic non-linear hyperelastic properties of the human skin has not yet been achieved. Realistic skin simulants would be of great use in a variety of biomechanical testing applications. For instance, a realistic simulant could be used to estimate the load response of cosmetic implants, or to further study the mechanics of skin injuries. A realistic skin simulant would be an invaluable aid for developing surgical techniques, especially for vaginal and other unique tissue types. In vaginal prolapse (POP), tissue stiffens progressively, making it difficult for surgeons to correctly suture and implants corrective devices. Faulty vaginal mesh surgeries have caused substantial pain and suffering in many women, and have resulted in malpractice lawsuits cumulatively totaling over 100 million dollars annually. To date, training for urogynoecological surgeries is limited due to the limited availability of vaginal tissue. In addition to ethical and safety concerns associated with sampling human vaginal tissue, it is known that vaginal tissue obtained from a cadaver is not the same as living tissue. As such, efforts to develop improved urogynocological techniques have been hampered.

The development of non-lethal and less-lethal munitions is an active area of research in the ballistics industry. A simulant with realistic mechanical properties of the human skin is essential in order to accurately predict the lethality of such munitions prior to their deployment in the field. The compositions and methods disclosed herein address these and other needs.

SUMMARY

In accordance with the purposes of the disclosed methods, as embodied and broadly described herein, the disclosed subject matter relates to compositions and methods of making and using the compositions. More specifically, according to the aspects illustrated herein, there are provided biofidelic skin simulants and methods of making and using the biofidelic skin simulants disclosed herein.

According to further aspects illustrated herein, biofidelic skin simulants are provided. The disclosed biofidelic skin simulants can comprise one or more crosslinked siloxane polymers, wherein the particular siloxane and degree of crosslinking are selected to produce a silicone network exhibiting the non-linear deformation properties of natural skin. Particularly disclosed herein are biofidelic skin simulants closely mimicking normal and prolapsed vaginal skin tissue at a lower test rate. These simulants can be used to develop surgical techniques, including but not limited to those for prolapse surgery, hysterectomy, and surgeries associated with childbirth, such as cesarean section or episiotomy. Also disclosed herein are methods of making biofidelic skin simulants. The disclosed methods can comprise, for example, crosslinking (or curing) one or more siloxane polymers in a manner sufficient to produce a silicone network exhibiting the non-linear viscoelastic properties of natural skin.

Additional advantages will be set forth in part in the description that follows or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

DETAILED DESCRIPTION

Figure 1A:
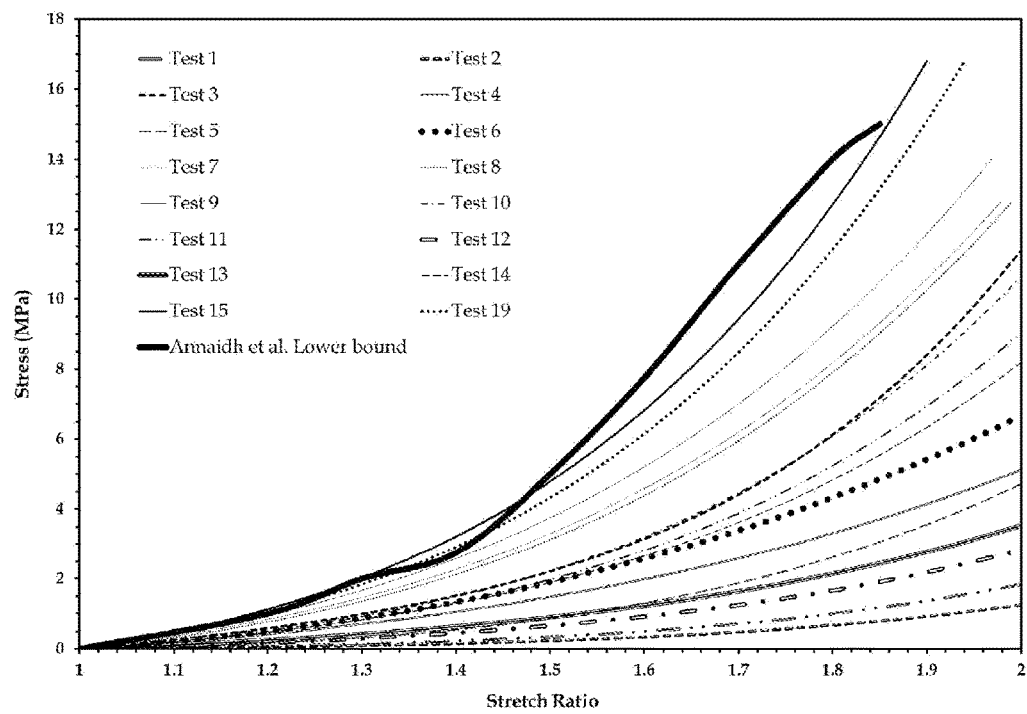
FIG. 1A and FIG. 1B display stretch-stress plots for various skin simulants in comparison to stretch-stress plots for naturally occurring human skin. The stretch ratio is plotted on the x-axis and the stress (MPa) is plotted on the y-axis.

The methods and compositions described herein may be understood more readily by reference to the following detailed description of specific aspects of the disclosed subject matter and the Examples included therein.

Before the present methods and compositions are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "the compound" includes mixtures of two or more such compounds, reference to "an agent" includes mixture of two or more such agents, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid the reader in distinguishing the various components, features, or steps of the disclosed subject matter. The identifiers "first" and "second" are not intended to imply any particular order, amount, preference, or importance to the components or steps modified by these terms.

By substantially the same is meant the values are within 5% of one another, e.g., within 3%, 2% or 1% of one another.

As used herein, the term "silicone rubber" refers to three-dimensional networks of cross-linked siloxane polymers. Unless specified otherwise, silicone rubbers include materials that are composed solely of crosslinked siloxane polymers, and materials that include other chemical compounds incorporated into the network. Such other chemical compounds can be covalently incorporated into the network, or can be incorporated into the network through non-covalent interactions (e.g., hydrogen bonds, electrostatic bonds, Van der Waal bonds and the like).

As used herein, the term "non-linear hyperelastic" describes a material in which some specified influence (such as stress) produces a response (such as strain or stretch) which is not proportional to the influence, and which can be characterized using constitutive curve fit equations known as the hyperelastic equations.

As used herein, the term "elasticity modulus (E) (low stretch ratio)" refers to the initial elasticity modulus or slope of the stress-stretch plot of a non-linear material approximated at low stretch values. The way to measure this is to draw a line starting at the origin and tangent to the stress-stretch plot, and numerically estimate its slope.

As used herein, the term "elasticity modulus (E) (high stretch ratio)" refers to the final elasticity modulus or slope of the stress-stretch plot of a non-linear material before rupture. The way to measure this is to draw a line starting at the point of rupture and tangent to the stress-stretch plot, and numerically estimate its slope.

As used herein, the term "ultimate tensile strength" refers to the value of stress applied to a material which just causes its rupture.

As used herein, the term "one-part siloxane" refers to a liquid siloxane composition which will undergo crosslinking in the absence of any added chemical reagent. Exemplary one-part siloxanes include those cured by heat, light, moisture, and combinations thereof.

Some one-part siloxanes can undergo crosslinking when exposed to ambient conditions (~23° C., standard humidity), whereas others require additional energy inputs (such as light or elevated heat) in order to crosslink.

As used herein, the term "two-part siloxane (Part A)," or simply "siloxane (Part A)," refers to a liquid siloxane composition that contains a latent reactive silicone functional group that requires activation by the exposure to an additional chemical reagent.

As used herein, the term "two-part siloxane (Part B)," or simply "siloxane (Part B)," refers to a liquid siloxane composition that contains a chemical reagent that will activate a silicone functional group to crosslinking.

Crosslinked siloxane networks can be characterized according to the Shore (Durometer) hardness scale, as defined by the American Society for Testing and Materials (ATSM) D2240 testing standard. Shore (Durometer) hardness can be measured along several different scales, including "OO", "A," and "D". Skin simulants can have, but are not limited to, networks having a Shore (Durometer) hardness from OO-10 to OO-60.

As used herein, the term "siloxane OO-10" refers to a liquid siloxane composition, which, when cured with another siloxane OO-10, will produce a silicone network having a Shore (Durometer) hardness of OO-10. One of ordinary skill will appreciate that when a siloxane (Part A) OO-30 is combined with an equal amount of siloxane (Part B) OO-30, the resulting network will have a Shore (Durometer) hardness of OO-30. However, when two siloxanes of differing Shore (Durometer) hardness levels are combined, the resulting network will have a Shore hardness different than either of the precursor siloxane components.

Biofidelic Skin Simulant

The biofidelic skin simulants disclosed herein have biomechanical properties similar to those of natural human skin. The biomechanical properties of human skin have been reported by Anniadh et al., in "Characterization of the anisotropic mechanical properties of excised human skin," JOURNAL OF THE MECHANICAL BEHAVIOR OF BIOMEDICAL MATERIALS (2012) 5:139-148, which is incorporated by reference herein in its entirety for its teaching of the mechanical properties of skin and methods of measuring those properties. Anniadh describes the non-linear hyperelastic properties of human skin. In some embodiments, the skin simulants disclosed herein exhibit non-linear properties falling with the ranges provided by Anniadh for human skin.

In some embodiments, the skin simulant can be characterized by an elasticity modulus (E) (low stretch ratio) of at least 2, 2.5, 3, 3.5, 4, 4.5, 5, 5.5, 6, 6.5, 7, 7.5, or 8 MPa, where any of the stated values can form an upper or lower endpoint of a range. In some embodiments, the skin simulant can be characterized by an elasticity modulus (E) (low stretch ratio) of no more than 8, 7.5, 7, 6.5, 6, 5.5, 5, 4.5, 4, 3.5, 3, 2.5, or 2 MPa, where any of the stated values can form an upper or lower endpoint of a range. For instance, the elasticity modulus (E) (low stretch ratio) can be from 2-8, 2-7.5, 2-7, 2-6.5, 2-6, 2-5.5, 2-5, 2-4.5, 2-4, 2-3.5, 2-3, 2-2.5, 7.5-8, 7-8, 6.5-8, 6-8, 5.5-8, 5-8, 4.5-8, 4-8, 3.5-8, 3-8, or 2.5-8 MPa. In some embodiments, the elasticity modulus (E) (low stretch ratio) can be from 4-8, 4-7.5, 4-7, 4-6.5, 4-6, 4-5.5, 4-5, 4-4.5, 7.5-8, 7-8, 6.5-8, 6-8, 5.5-8, 5-8, or 4.5-8 MPa.

The skin simulant can be characterized by an elasticity modulus (E) (high stretch ratio) of at least 6, 13, 20, 27, 34, 41, 48, 55, 62, 69, 76, 83, or 90 MPa, where any of the stated values can form an upper or lower endpoint of a range. The skin simulant can be characterized by an elasticity modulus (E) (high stretch ratio) of no more than 90, 83, 76, 69, 62, 55, 48, 41, 34, 27, 20, 13 or 6 MPa, where any of the stated values can form an upper or lower endpoint of a range. For instance, the elasticity modulus (E) (high stretch ratio) can be from 6-90, 6-83, 6-76, 6-69, 6-62, 6-55, 6-48, 6-41, 6-34, 6-27, 6-20, 6-13, 83-90, 76-90, 69-90, 62-90, 55-90, 48-90, 41-90, 34-90, 27-90, 20-90, or 13-90 MPa. In some embodiments, the elasticity modulus (E) (high stretch ratio) can be from 34-90, 34-83, 34-76, 34-69, 34-62, 34-55, 34-48, 34-41, 83-90, 76-90, 69-90, 62-90, 55-90, 48-90, or 41-90 MPa.

In some embodiments, the skin simulant can be a vaginal skin simulant at a lower test rate. Prolapsed vaginal skin simulants can be characterized by an elasticity modulus (E) (low stretch ratio) from 2-8, 2-7, 2-6, 2-5, 2-4, 2-3, 6-7, 5-7, 4-7, or 3-7 MPa. Prolapsed vaginal skin simulants can be characterized by an elasticity modulus (E) (high stretch ratio) from 12-60, 12-24, 12-36, 12-48, 48-60, 36-60, or 24-60 MPa.

Normal vaginal skin simulants can be characterized by an elasticity modulus (E) (low stretch ratio) from 0.3-2.7, 0.3-2.4, 0.3-2.1, 0.3-1.8, 0.3-1.5, 0.3-1.2, 0.3-0.9, 0.3-0.6, 2.4-2.7, 2.1-2.7, 1.8-2.7, 1.5-2.7, 1.2-2.7, 0.9-2.7, or 0.6-2.7 MPa. Normal vaginal skin simulants can be characterized by an elasticity modulus (E) (high stretch ratio) from 3-12, 3-9, 3-6, 9-12, or 6-12 MPa.

The skin simulant can be characterized by an ultimate tensile strength of at least 1, 2, 3, 4, 5, 6, 7, 8, 9, 10, 15, 20, or 25 MPa, where any of the stated values can form an upper or lower endpoint of a range. The skin simulant can be characterized by an ultimate tensile strength no greater than 25, 20, 15, 10, 9, 8, 7, 6, 5, 4, 3, 2, or 1 MPa, where any of the stated values can form an upper or lower endpoint of a range. The ultimate tensile strength can be from 1-25, 1-20, 1-15, 1-10, 1-9, 1-8, 1-7, 1-6, 1-5, 1-4, 1-3, 1-2, 20-25, 15-25, 10-25, 9-25, 8-25, 7-25, 6-25, 5-25, 4-25, 3-25, or 2-25 MPa. In some embodiments, the ultimate tensile strength can be from 5-20, 5-15, 5-10, 10-15, 15-20, 15-25, or 20-25 MPa.

Hyperelastic constitutive equations are able to precisely curve fit the non-linear stress versus stretch behavior of soft tissues such as the human skin. Veronda-Westmann hyperelastic stress and stretch relationship for curve fitting an isotropic uniaxial mechanical test data is given by equation (1), and the following table gives the curve fit parameters for all the 23 skin simulant samples tested. Samples 16, 17, 18, 20, 21 and 22 are shown in FIG. 1, Panel B.

$$\sigma_{Veronda-Westmann} = 2\left(\lambda^2 - \frac{1}{\lambda}\right)c_1 c_2\left(e^{c_2(I_1-3)} - \frac{1}{2\lambda}\right) \quad (1)$$

| Sample | Veronda-Westmann Hyperelastic model coefficients | |
|---|---|---|
| | $c_1$ | $c_2$ |
| 1 | 1.1 | 0.23 |
| 2 | 1 | 0.2 |
| 3 | 5.9 | 0.28 |
| 4 | 3.4 | 0.25 |
| 5 | 2.3 | 0.27 |
| 6 | 4 | 0.26 |
| 7 | 6 | 0.32 |
| 8 | 5.8 | 0.3 |
| 9 | 6.5 | 0.29 |
| 10 | 5.4 | 0.27 |
| 11 | 5.2 | 0.26 |
| 12 | 1.5 | 0.25 |
| 13 | 2 | 0.3 |
| 14 | 5 | 0.25 |
| 15 | 11.8 | 0.2 |
| 16 | 16 | 0.22 |
| 17 | 35 | 0.33 |
| 18 | 18 | 0.23 |
| 19 | 11.5 | 0.21 |
| 20 | 13.7 | 0.21 |
| 21 | 28 | 0.3 |

-continued

| | Veronda-Westmann Hyperelastic model coefficients | |
|---|---|---|
| Sample | $c_1$ | $c_2$ |
| 22 | 24 | 0.28 |
| 23 | 13.1 | 0.21 |

The skin simulants disclosed herein can be crosslinked siloxane networks. Suitable siloxane polymers for incorporation into the network include those giving rise to silicone rubbers having a Shore (Durometer) hardness from 00-0 to 00-60, including 00-0, 00-10, 00-20, 00-30, 00-40, 00-50, and 00-60. However, other siloxanes, for instance those which, when cured alone, result in more rigid elastomers, can also be incorporated into the skin simulant.

The skin simulants disclosed herein comprise silicone rubber. Silicone rubber is an elastomeric network of crosslinked siloxane polymers. Some silicone rubbers are characterized as "one-part," whereas others are referred to as "two-part." One and two-part silicone rubbers are distinguished based on how they are cured. One part silicone rubbers are obtained by curing a single liquid siloxane precursor. Crosslinking such one-part systems can occur in the presence of air, light, and/or heat. Two-part silicone rubbers are prepared by combining two separate siloxane liquids. Each part contains a reactive component which, when combined, initiates the crosslinking reacting. Two-part silicone systems include addition-cured rubbers such as platinum cure rubbers, condensation-cured rubbers such as tin-cured rubbers, and peroxide-cured rubbers. The individual components of a two-part silicone rubber are often designated "Part A" and "Part B."

In certain embodiments, the skin simulants disclosed herein are made from a single one-part or two-part siloxane. Such simulants are designated herein as "unitary silicone simulants." In other embodiments, the skin simulant is made from two different one-part or two-part siloxanes. Such simulants are designated herein as "binary silicone simulants." Higher order systems, such as ternary or quaternary refer to systems made from three, or four, different siloxanes (one-part or two-part), respectively.

In some embodiments, the skin simulant is a blend of at least one siloxane having a Shore hardness from 00-0 to 00-15, and a second siloxane having a Shore hardness from 00-25 to 00-60. In some embodiments, the first siloxane has a Shore hardness from 00-05 to 00-15 and the second siloxane has a Shore hardness from 00-25 to 00-40. In certain examples, the first siloxane has a Shore hardness of 00-10 and the second siloxane has a Shore hardness of 00-30.

For certain types of skin simulants, the first and second siloxane can be present in a ratio from 1:99 to 20:80 by weight of the total silicone rubber. When either the first or second is a two part silicone system, the ratio includes the sum of both Parts A and B. The first siloxane, having a Shore hardness from 00-05 to 00-15, can be present in an amount that is no more than 20%, 15%, 12%, 10%, 8%, 6%, 4%, or 2% by weight of the total siloxane content. The second siloxane, having a Shore hardness from 00-25 to 00-40, can be present in an amount that is at least 80%, 85%, 88%, 90%, 92%, 94%, 96%, or 98% by weight of the total siloxane rubber content.

In other examples, skin simulants having a different spectrum of properties can be obtained by blending a first siloxane, having a Shore hardness from 00-05 to 00-15, in an amount that is at least 50%, 55%, 60%, 65%, 70%, 75%, or 80% by weight of the total siloxane content. The second siloxane, having a Shore hardness from 00-25 to 00-40, can be present in an amount no more than 50, 45, 40, 35, 30, 25, or 20% by weight of the total siloxane content.

In some examples, the skin simulants, including those mimicking the vaginal skin simulants at a lower strain rate, can be obtained by blending a first siloxane having a Shore hardness of 00-10 and a second siloxane having a Shore hardness of 00-30. The first and second siloxanes can be mixed together in a weight ratio from 25:75 to 35:65, or 27.5:72:5 to 32.5:67.5, or 29:71 to 31:69. In certain selected embodiments, the first and second siloxanes can be mixed together in a weight ratio from 35:65 to 40:60, or 35:65 to 37.5:62.5, or 37.5:62.5 to 40:60, or 32.5:67.5 to 35:65.

Other components can be incorporated into the skin simulants. For instance, oils can be added to modify the overall stiffness of the simulant, and dyes can be included to produce simulants of differing colors.

Skin simulants can be prepared by combining one or more liquid siloxanes, as well as any additional ingredients, in a mold and allowing them to cure. Generally, all the siloxanes should be well blended to ensure a uniform simulant. In other embodiments, however, a layered simulant can be prepared by sequentially curing different siloxane mixtures in a mold.

The skin simulants disclosed herein can be employed in a wide variety of testing applications. For instance, real life injury scenarios can be recreated using a human skin surrogate and personal protective equipment (PPE) and safety systems in a wide range of applications, including military, automotive, biomedical, security, sports equipment etc. The skin simulant can be used for extensive testing on the load response of the implants on the skin as well as for developing lighter and more reliable implant technologies in the future. The skin simulant material can also be used to design human torsos for estimating the dynamic load response of ballistics for development of non-lethal and less-lethal ballistic munitions in the future. Additionally, in the field of ergonomics, this human skin simulant can help estimate the discomfort level in individuals at different working conditions (such as a hard seat at work, loose car steering or a tight fitting dress of a swimmer).

The examples below are intended to further illustrate certain aspects of the methods and compounds described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods, compositions, and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures, and other reaction ranges and conditions that can be used to optimize the product purity and yield obtained from the described process. Only reasonable and routine experimentation will be required to optimize such process conditions.

Example 1

Preparation of Biofidelic Skin Simulants

Binary skin simulants were prepared by blending together ECOFLEX 0010™ and MOLDSTAR 30™. ECOFLEX 0010™ is a two-part platinum cure silicone rubber having a Shore (Durometer) hardness of 00-10. MOLDSTAR 30™ is a two-part platinum cure silicone rubber having a Shore (Durometer) hardness of 30A. Both products are commercially sold by Smooth-On, Inc. All four components were blended together, placed in a mold blank, and cured for an average of 6.5 hours at room temperature. By varying the size of the mold, skin simulant coupons were prepared having a length of 5 cm, a width of 1 cm, and thickness of either 1, 2, 3, or 4 mm.

The following skin simulants were prepared:

| | ECOFLEX 0010 ™ | | MOLDSTAR 30 ™ | |
|---|---|---|---|---|
| Sample | Part A | Part B | Part A | Part B |
| 1 | 45 | 45 | 5 | 5 |
| 2 | 45 | 45 | 5 | 5 |
| 3 | 15 | 15 | 35 | 35 |
| 4 | 42 | 42 | 8 | 8 |
| 5 | 42 | 42 | 8 | 8 |
| 6 | 35 | 35 | 15 | 15 |
| 7 | 12.5 | 12.5 | 37.5 | 37.5 |
| 8 | 12.5 | 12.5 | 37.5 | 37.5 |
| 9 | 10 | 10 | 40 | 40 |
| 10 | 15 | 15 | 35 | 35 |
| 11 | 15 | 15 | 35 | 35 |
| 12 | 45 | 45 | 5 | 5 |
| 13 | 42 | 42 | 8 | 8 |
| 14 | 25 | 25 | 25 | 25 |
| 15 | 5 | 5 | 45 | 45 |
| 16 | 3 | 3 | 47 | 47 |
| 17 | 3 | 3 | 57 | 37 |
| 18 | 3 | 3 | 47 | 47 |
| 19 | 5 | 5 | 45 | 45 |
| 20 | 5 | 5 | 47 | 43 |
| 21 | 3 | 3 | 54 | 40 |
| 22 | 3 | 3 | 52 | 42 |
| 23 | 4 | 4 | 46 | 46 |

Figure 1B:
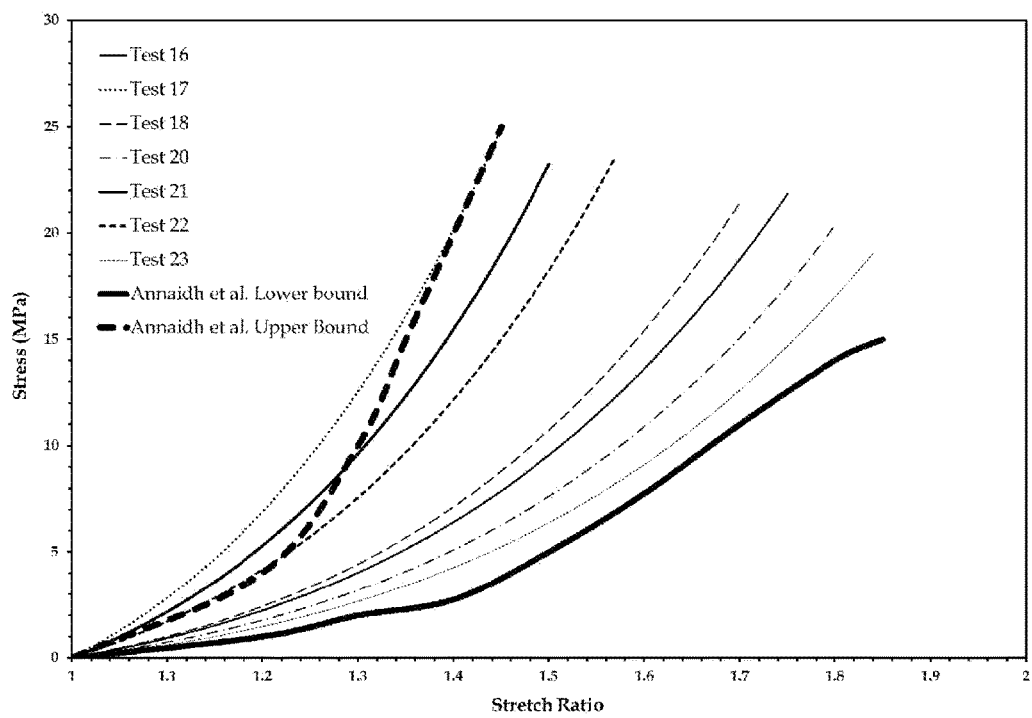

The samples above were evaluated according to their stress-stretch response. The results are depicted in FIGS. 1A and 1B.

Figure 2:
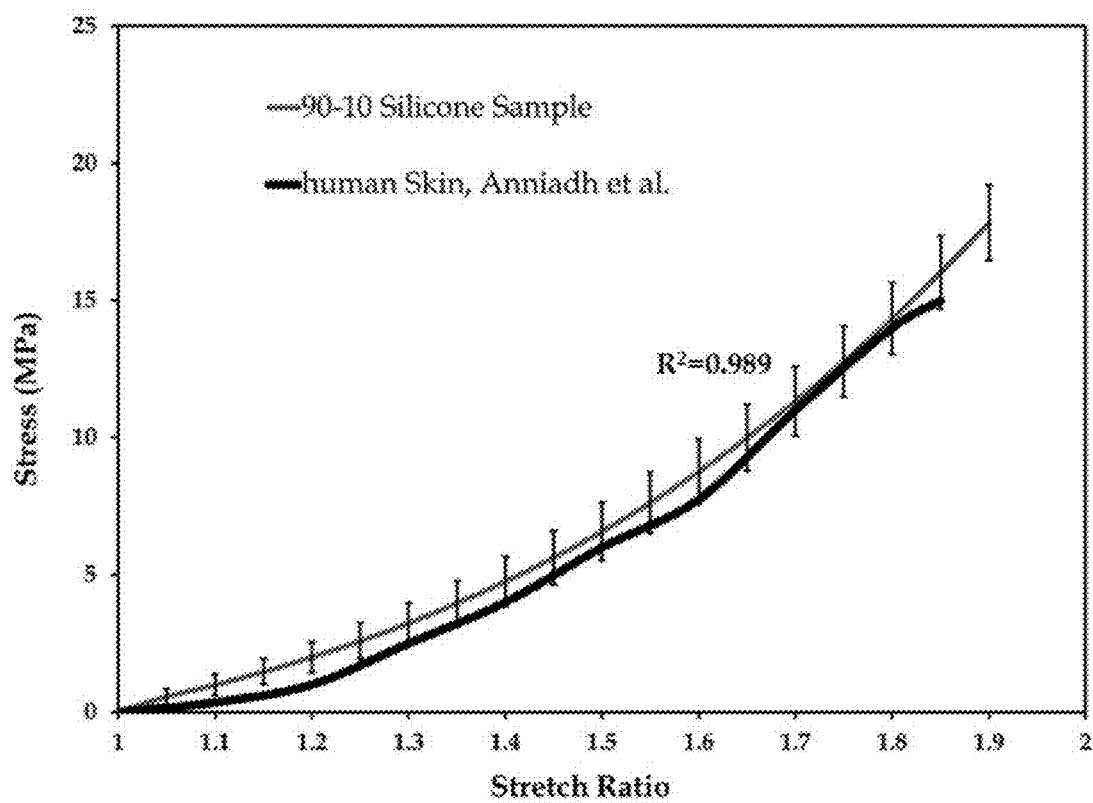
FIG. 2 displays a stretch-stress plot for a skin simulant compared with natural human skin. The stretch ratio is plotted on the x-axis and the stress (MPa) is plotted on the y-axis.

Sample 15 was tested to determine the reproducibility of its stretch-stress response in comparison with human skin. The results are depicted in FIG. 2.

Figure 3:
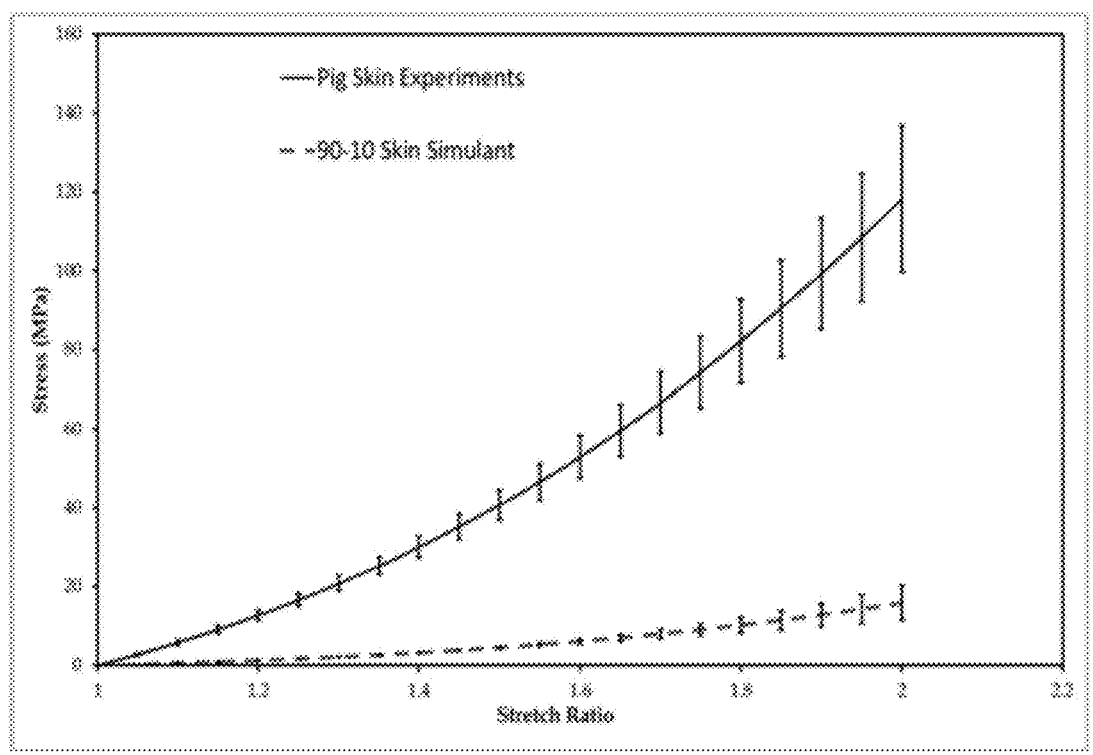
FIG. 3 displays stretch-stress (high stress range) plots for a skin simulant compared with fresh pig skin. The stretch ratio is plotted on the x-axis and the stress (MPa) is plotted on the y-axis.
Figure 4:
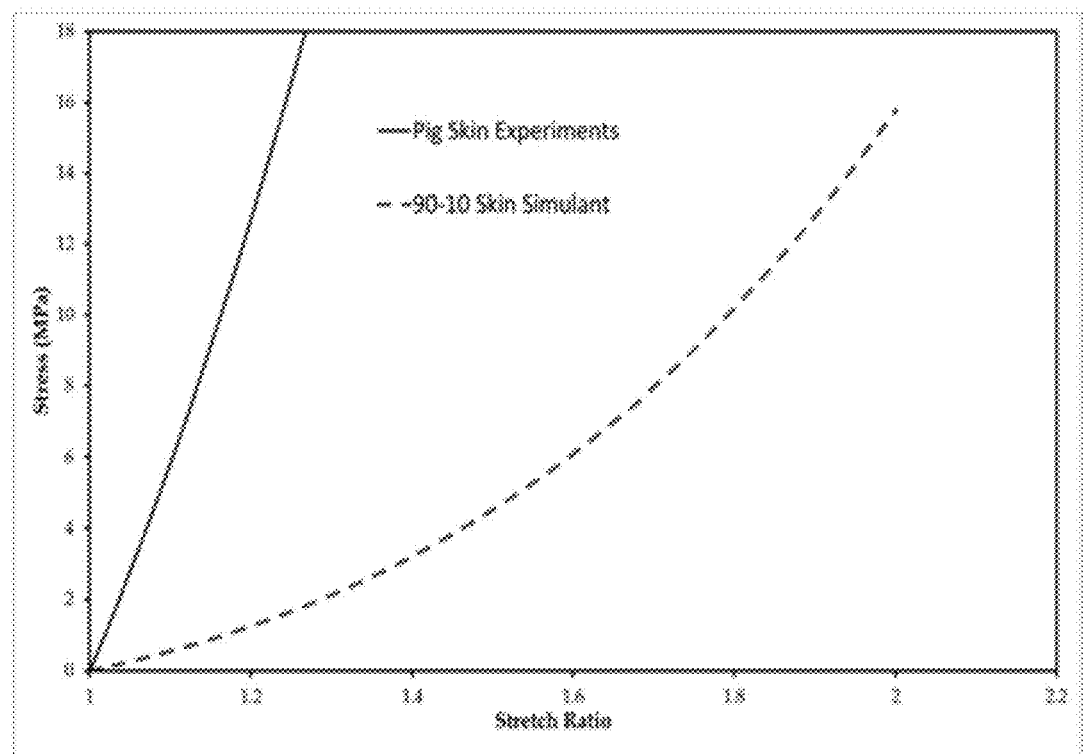
FIG. 4 displays stretch-stress (low stress range) plots for a skin simulant compared with fresh pig skin. The stretch ratio is plotted on the x-axis and the stress (MPa) is plotted on the y-axis.
Figure 5:
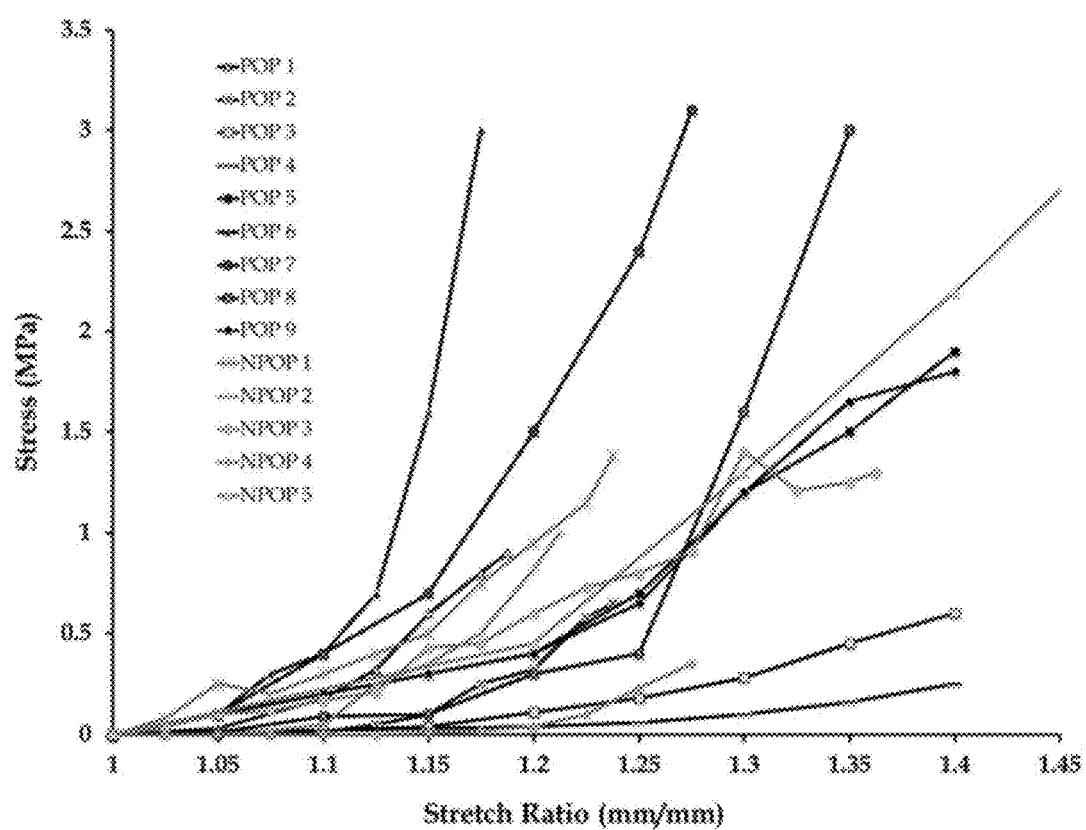
FIG. 5 displays stretch-stress plots of normal and prolapsed vaginal tissue collated from the scientific literature. The stretch ratio is plotted on the x-axis and the stress (MPa) is plotted on the y-axis.

Sample 15 was tested against freshly cut pig skin in both a high stress (FIG. 3) and low stress (FIG. 4) range.

Example 2

Vaginal Tissue Surrogates

The following skin simulants were prepared:

| | ECOFLEX 0010 ™ | | MOLDSTAR 30 ™ | |
|---|---|---|---|---|
| Sample | Part A | Part B | Part A | Part B |
| 1 V | 15.66 | 14.25 | 34.42 | 35.77 |
| 2 V | 15.25 | 13.92 | 34.08 | 36.75 |
| 3 V | 14.08 | 13.95 | 36.15 | 35.82 |
| 4 V | 14.97 | 14.96 | 34.97 | 35.10 |
| 5 V | 15.07 | 15.06 | 34.97 | 34.93 |
| 6 V | 8 | 8 | 42 | 42 |
| 7 V | 30 | 30 | 20 | 20 |
| 8 V | 15 | 15 | 35 | 35 |
| 9 V | 48 | 32 | 10 | 10 |
| 10 V | 25 | 25 | 25 | 25 |
| 11 V | 2 | 2 | 47 | 47 |
| 12 V | 2 | 2 | 47 | 47 |
| 13 V | 10 | 10 | 40 | 40 |
| 14 V | 10 | 10 | 40 | 40 |
| 15 V | 15 | 15 | 35 | 35 |
| 16 V | 42 | 42 | 8 | 8 |
| 17 V | 42 | 42 | 8 | 8 |
| 18 V | 45 | 45 | 5 | 5 |
| 19 V | 45 | 45 | 5 | 5 |
| 20 V | 50 | 50 | 0 | 0 |

The low and high stretch elasticity modulus (MPa/(mm/mm)) was determined for each of the above samples:

| Sample | Low Stretch Elasticity Modulus | High Stretch Elasticity Modulus |
|---|---|---|
| 1 V | 3.382 | 12.613 |
| 2 V | 3.420 | 17.906 |
| 3 V | 1.951 | 12.746 |
| 4 V | 3.061 | 16.520 |
| S V | 3.164 | 14.162 |
| 6 V | 5.078 | 19.503 |
| 7 V | 1.329 | 9.097 |
| 8 V | 2.122 | 11.935 |
| 9 V | 1.134 | 8.157 |
| 10 V | 1.344 | 7.408 |
| 11 V | 6.223 | 46.441 |
| 12 V | 7.917 | 58.889 |
| 13 V | 4.660 | 20.620 |
| 14 V | 5.297 | 29.186 |
| 15 V | 3.232 | 12.613 |
| 16 V | 0.871 | 10.353 |
| 17 V | 0.704 | 7.852 |
| 18 V | 0.667 | 6.596 |
| 19 V | 2.584 | 4.541 |
| 20 V | 0.347 | 3.869 |

Figure 6:
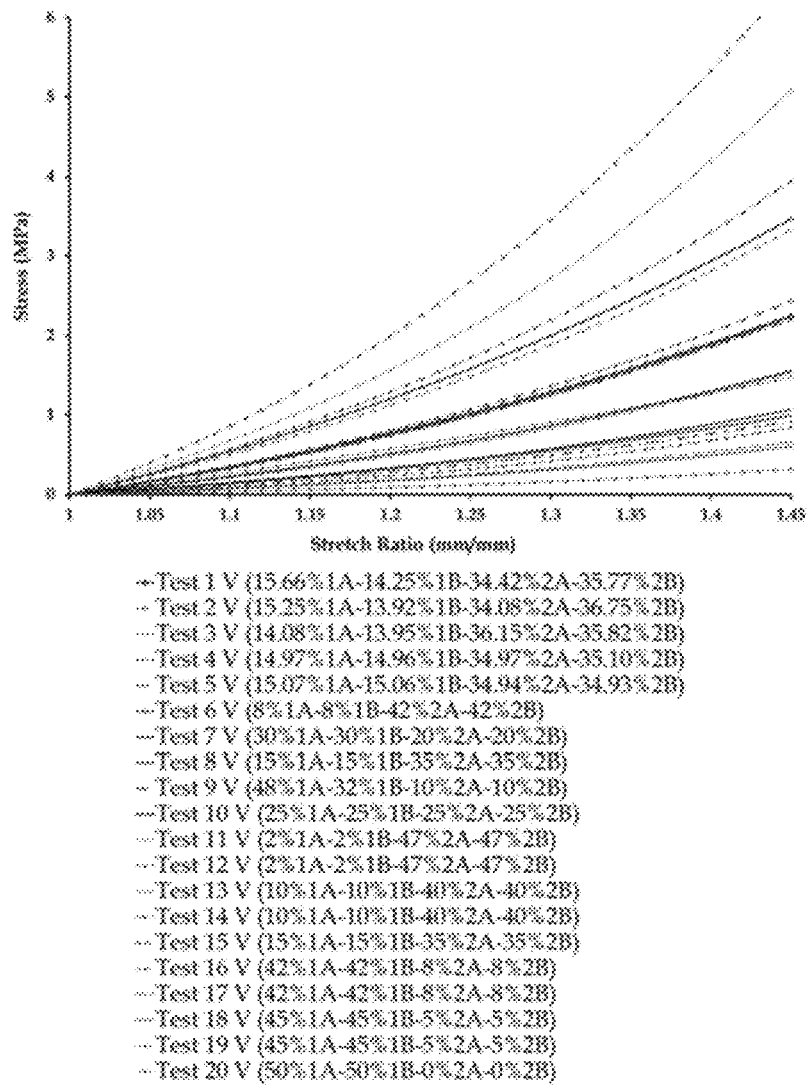
FIG. 6 displays stretch-stress plots of various vaginal tissue simulants. The stretch ratio is plotted on the x-axis and the stress (MPa) is plotted on the y-axis.
Figure 7:
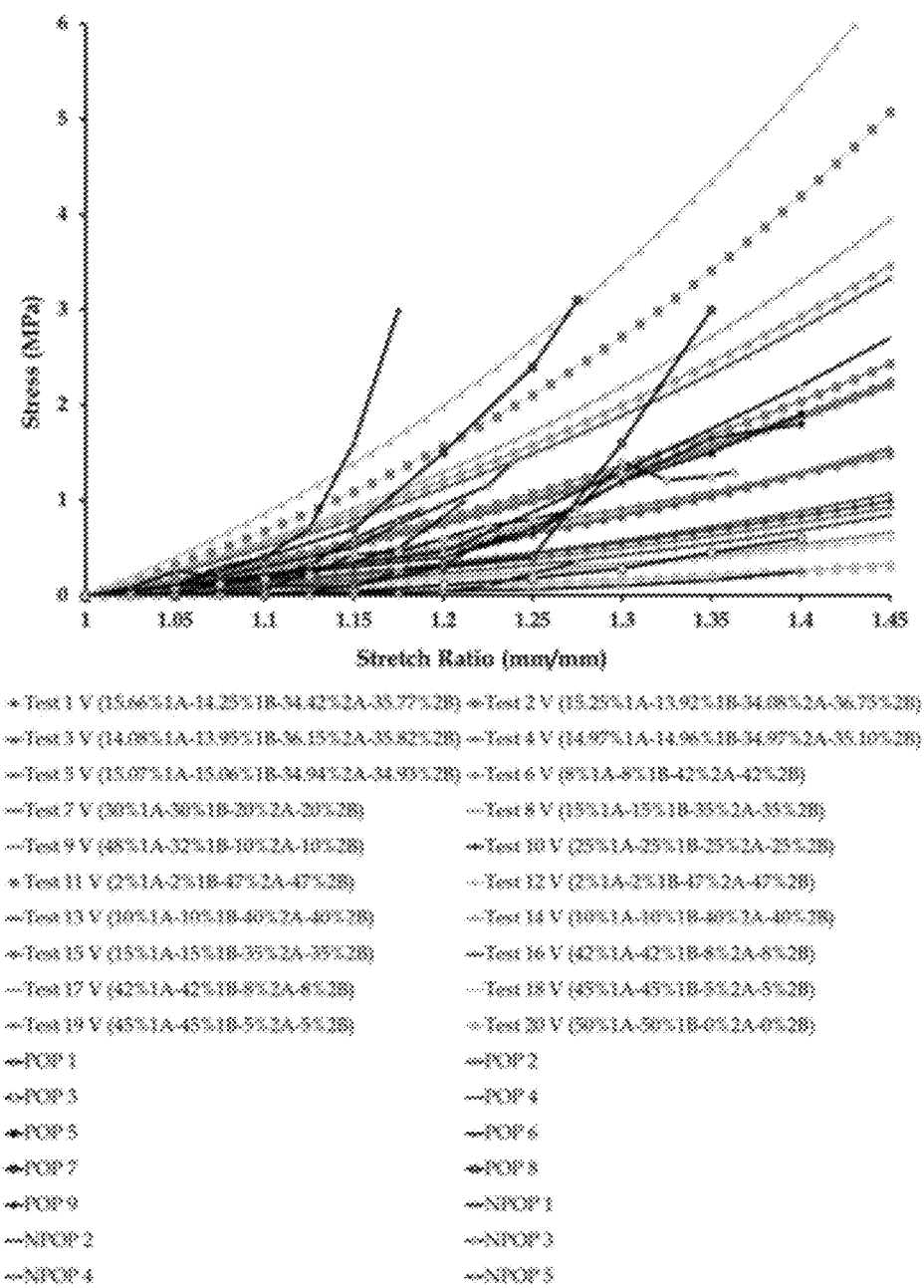
FIG. 7 displays stretch-stress plots of vaginal tissue simulants in comparison with literature derived vaginal tissue reports. The stretch ratio is plotted on the x-axis and the stress (MPa) is plotted on the y-axis. NPOP refers to non-prolapsed normal vaginal tissue, and POP refers to prolapsed vaginal tissue.
Figure 8:
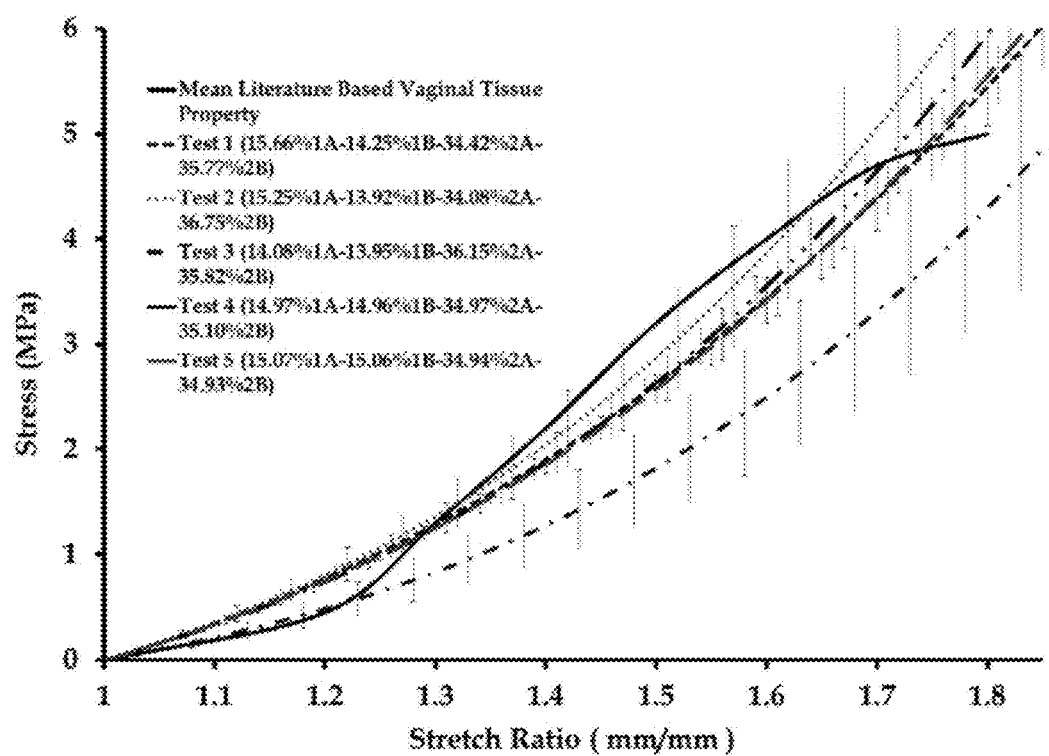
FIG. 8 displays stretch-stress plots of repeated tests of a control vaginal tissue simulant in comparison with mean normal vaginal tissue property derived from literature. The stretch ratio is plotted on the x-axis and the stress (MPa) is plotted on the y-axis.
Figure 9:
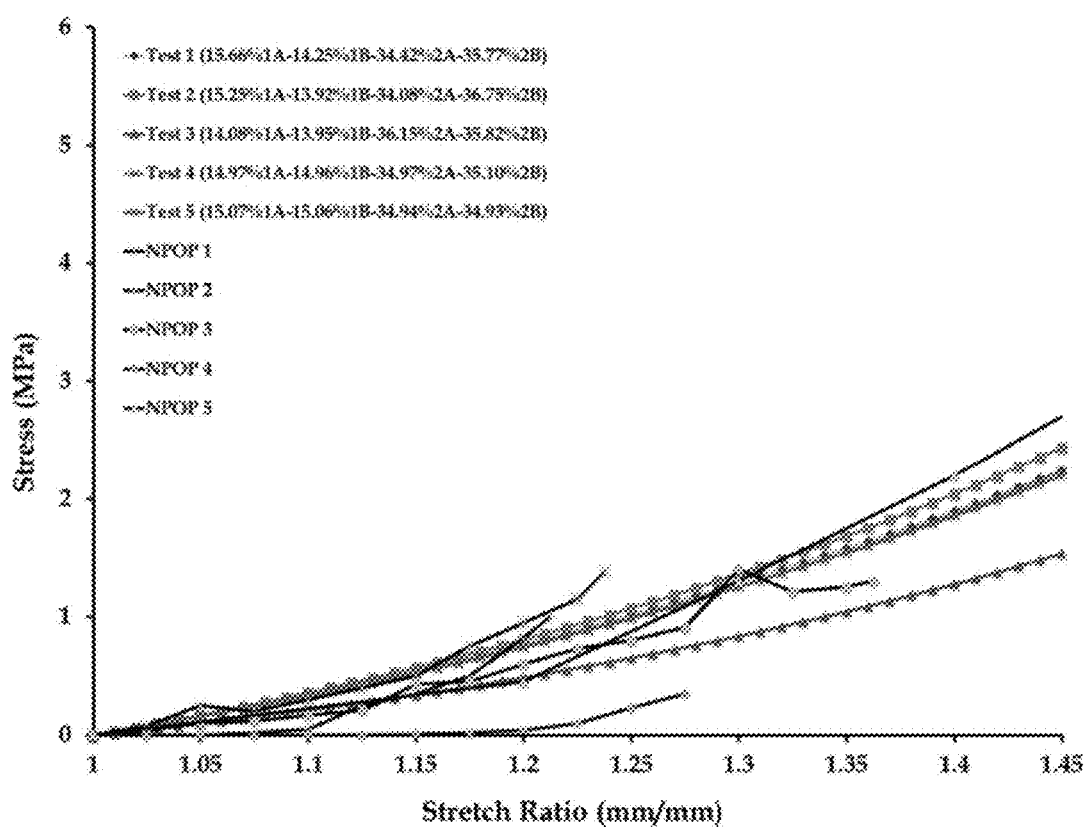
FIG. 9 displays stretch-stress plots of repeated tests of a control vaginal tissue simulant in comparison with non-prolapsed (normal) vaginal tissue property derived from literature. The stretch ratio is plotted on the x-axis and the stress (MPa) is plotted on the y-axis. NPOP refers to non-prolapsed normal vaginal tissue.
Figure 10:
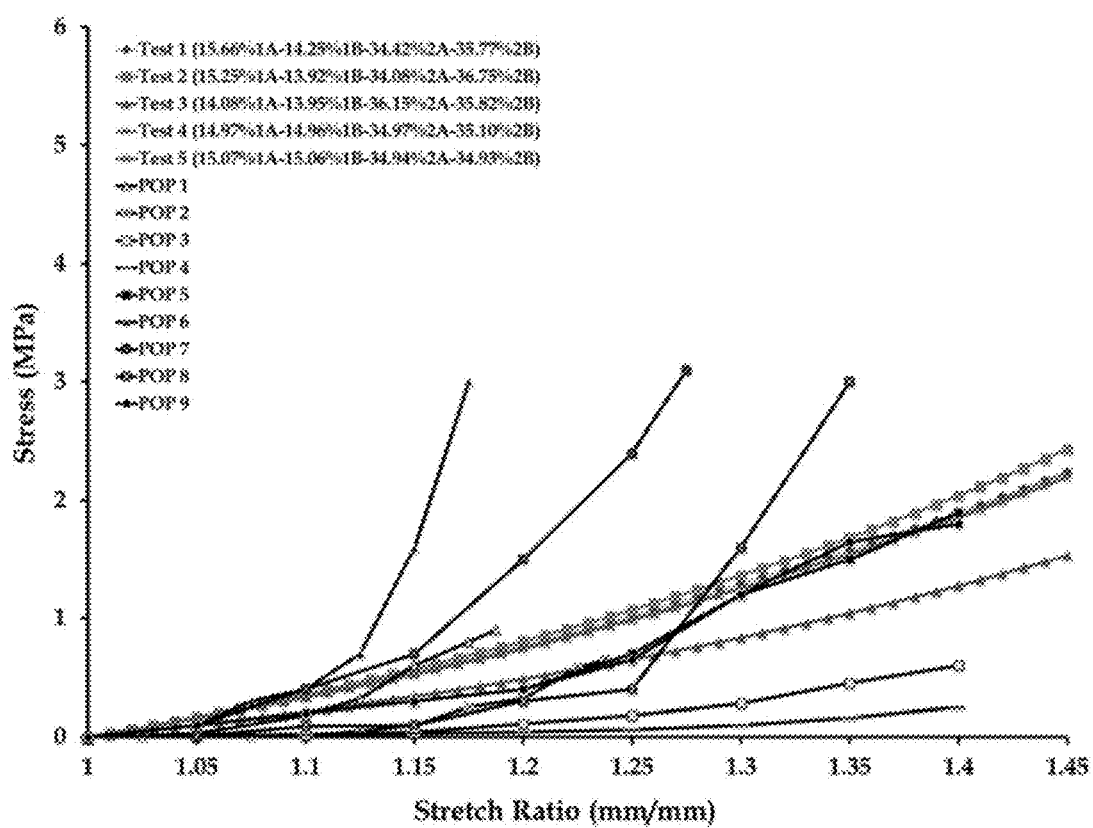
FIG. 10 displays stretch-stress plots of repeated tests of a control vaginal tissue simulant in comparison with prolapsed vaginal tissue property derived from literature. The stretch ratio is plotted on the x-axis and the stress (MPa) is plotted on the y-axis. POP refers to prolapsed vaginal tissue.

FIG. 6 depict the non-linear behavior of the above samples. FIGS. 7-10 depict selected examples in comparison with normal and prolapsed tissue data.

The Veronda-Westmann hyperelastic stress and stretch relationship was determined. The following table lists the curve fit parameters for the 20 vaginal simulant samples.

| Sample | $C_1$ (MPa) | $C_2$ (MPa) |
|---|---|---|
| 1 V | 9.83 | 0.115 |
| 2 V | 7.1 | 0.173 |
| 3 V | 4.3 | 0.187 |
| 4 V | 5.7 | 0.19 |
| 5 V | 5.4 | 0.187 |
| 6 V | 11.6 | 0.142 |

-continued

| Sample | $C_1$ (MPa) | $C_2$ (MPa) |
|---|---|---|
| 7 V | 3.3 | 0.175 |
| 8 V | 4.1 | 0.189 |
| 9 V | 2.5 | 0.198 |
| 10 V | 2.2 | 0.215 |
| 11 V | 8.4 | 0.275 |
| 12 V | 9.3 | 0.3 |
| 13 V | 11.8 | 0.14 |
| 14 V | 8.5 | 0.215 |
| 15 V | 9.9 | 0.116 |
| 16 V | 1.3 | 0.32 |
| 17 V | 0.9 | 0.34 |
| 18 V | 0.8 | 0.335 |
| 19 V | 10 | 0.068 |
| 20 V | 0.55 | 0.3 |

The methods and compositions of the appended claims are not limited in scope by the specific methods and compositions described herein, which are intended as illustrations of a few aspects of the claims and any methods and compositions that are functionally equivalent are within the scope of this disclosure. Various modifications of the methods and compositions in addition to those shown and described herein are intended to fall within the scope of the appended claims. Further, while only certain representative methods, compositions, and aspects of these methods and compositions are specifically described, other methods and compositions and combinations of various features of the methods and compositions are intended to fall within the scope of the appended claims, even if not specifically recited. Thus a combination of steps, elements, components, or constituents can be explicitly mentioned herein; however, all other combinations of steps, elements, components, and constituents are included, even though not explicitly stated.

What is claimed is:

1. A biofidelic skin simulant comprising a crosslinked siloxane network,
    wherein the network comprises a first siloxane having a Shore Hardness of 00-10, and a second siloxane having a Shore Hardness of 30A, wherein the weight ratio of the first siloxane to second siloxane is from 10:90 to 4:96.

2. A method for preparing a biofidelic skin simulant, comprising curing a combination comprising a first siloxane having a Shore Hardness of 00-10, and a second siloxane having a Shore Hardness of 30A, wherein the weight ratio of the first siloxane to second siloxane is from 10:90 to 4:96.

3. The method according to claim 2, wherein the skin simulant is a vaginal skin simulant.

* * * * *